United States Patent
Gabel et al.

(10) Patent No.: US 11,753,541 B2
(45) Date of Patent: Sep. 12, 2023

(54) DISPERSING AGENT

(71) Applicant: Clariant International Ltd., Muttenz (CH)

(72) Inventors: Dorothee Gabel, Wiesbaden (DE); Felix Hövelmann, Mühldorf (DE); Rainer Kupfer, Hattersheim (DE); Benjamin Scheinhardt, Frankfurt (DE); Dietmar Beck, Frankfurt am Main (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 286 days.

(21) Appl. No.: 17/425,291

(22) PCT Filed: Jan. 13, 2020

(86) PCT No.: PCT/EP2020/050630
§ 371 (c)(1),
(2) Date: Jul. 22, 2021

(87) PCT Pub. No.: WO2020/151973
PCT Pub. Date: Jul. 30, 2020

(65) Prior Publication Data
US 2022/0081558 A1 Mar. 17, 2022

(30) Foreign Application Priority Data

Jan. 23, 2019 (DE) .................... 10 2019 200 789.9
Apr. 2, 2019 (EP) ..................... 19166815

(51) Int. Cl.
| | |
|---|---|
| *C08L 71/02* | (2006.01) |
| *C08G 65/331* | (2006.01) |
| *C08G 65/335* | (2006.01) |
| *C09K 23/04* | (2022.01) |
| *C09K 23/42* | (2022.01) |

(52) U.S. Cl.
CPC ............ *C08L 71/02* (2013.01); *C08G 65/331* (2013.01); *C08G 65/3355* (2013.01); *C09K 23/04* (2022.01); *C09K 23/42* (2022.01); *C08G 2650/30* (2013.01); *C08G 2650/38* (2013.01)

(58) Field of Classification Search
None
See application file for complete search history.

(56) References Cited

U.S. PATENT DOCUMENTS

| | | | | |
|---|---|---|---|---|
| 2001/0025070 | A1* | 9/2001 | Boinowitz ............ | C09K 23/14 524/141 |
| 2009/0095202 | A1 | 4/2009 | Fechner | |
| 2010/0222500 | A1* | 9/2010 | Ahrens ............. | C08G 65/2609 106/494 |

FOREIGN PATENT DOCUMENTS

| | | |
|---|---|---|
| CN | 104100749 | 10/2014 |
| DE | 2638946 | 3/1978 |
| DE | 19940797 | 3/2001 |
| DE | 10252452 | 5/2004 |

(Continued)

OTHER PUBLICATIONS

International Search Report for App. No. PCT/EP2020/050630, dated May 26, 2020, 4 pages.

(Continued)

*Primary Examiner* — Christopher M Rodd
(74) *Attorney, Agent, or Firm* — Tod A. Waldrop

(57) ABSTRACT

The invention relates to compositions containing compounds of formula (I), formula (II), or mixtures thereof, in which n is an integer greater than or equal to 1, R¹, an aliphatic, linear or branched hydrocarbon group having 1 to 10 carbon atoms, a hydrogen atom, the structural unit —O—X, or the structural unit —CH₂—O—X, X corresponds to formula (III), in which a is an integer from 2 to 6, b is an integer from 0 to 3, c is an integer from 20 to 28, m is 1 or 2, R² is an aliphatic, linear or branched hydrocarbon group having 1 to 10 carbon atoms, Y is hydrogen, —SO₃M, —SO₂M, —PO₃M₂, or —CH₂COOM, and M is a cation. The compounds of formula (I), of formula (II), or mixtures thereof are preferably suitable to act as a dispersing agent.

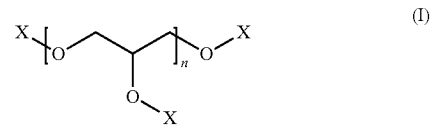

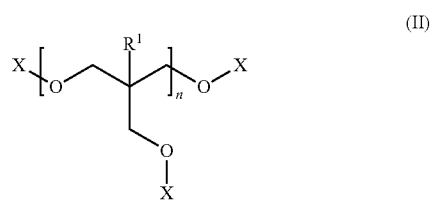

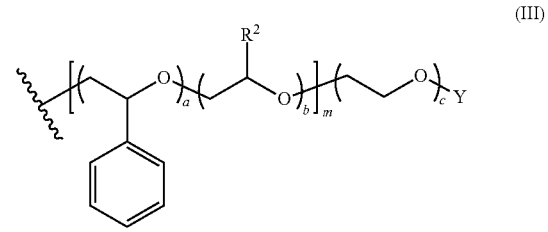

21 Claims, No Drawings

(56) References Cited

FOREIGN PATENT DOCUMENTS

| | | |
|---|---|---|
| DE | 102006002800 A1 | 8/2007 |
| DE | 102019200789 A1 | 7/2020 |
| EP | 0940406 | 9/1999 |
| EP | 1078946 | 2/2001 |
| EP | 1805270 | 7/2007 |
| EP | 2147066 | 1/2010 |
| EP | 3260480 | 12/2017 |
| JP | 2000290343 A | 10/2000 |
| JP | 2005126432 A | 5/2005 |
| JP | 2006505661 A | 2/2006 |
| JP | 2009523868 A | 6/2009 |
| JP | 2009534506 A | 9/2009 |
| WO | 2020152093 A1 | 7/2020 |

OTHER PUBLICATIONS

International Search Report issued in App. No. PCT/EP2020/051262, dated Mar. 26, 2020, 2 pages.

* cited by examiner

DISPERSING AGENT

The invention provides branched, block-type, polymeric dispersing agents. These are suitable for emulsifying or dispersing solid and liquid materials in aqueous liquids. For example, the dispersing agents according to the invention may be used to prepare aqueous pigment preparations of organic and inorganic pigments, or aqueous formulations of crop protection agents.

Various dispersing agents with block copolymer structure are known from the prior art.

EP 3 260 480 describes the advantage of a block-type arrangement of various monomers over a random arrangement in the use of such polymers as dispersing agent. These polymers are obtained via free-radical polymerization techniques.

EP 1 078 946 describes linear, block-type polyalkylene oxides with the structure $R^1O(SO)_a(EO)_b(PO)_c(BO)_dR^2$ as a low-foam wetting and dispersing agent. They are obtained by anionic ring-opening polymerization. Here, $R^1$ is a straight-chain or branched or cycloaliphatic radical having 8 to 13 carbon atoms. $R^2$ is hydrogen, an acyl radical, alkyl radical, or carboxylic acid radical having in each case 1 to 8 carbon atoms, SO is styrene oxide, EO is ethylene oxide, PO is propylene oxide, BO is butylene oxide and a is 0 to 1.9, b is 3 to 50, c is 0 to 3 and d is 0 to 3.

EP 0 940 406 discloses in particular the use of phosphoric esters which are obtainable by reaction of an ω-hydroxy-functional oligo- or poly(alkyl)styrene to give a poly(alkyl)styrene-block(b)-polyalkylene oxide copolymer and subsequent conversion to the corresponding phosphoric ester. Here too, linear polymers are again disclosed.

DE 10 2006 002 800 discloses dispersing agents based on copolymers of styrene oxide, alkylene oxides and di- or higher-functional amines and alcohols. This results in branched, block-type structures which enable the preparation of liquid, low-viscosity and foam-free pigment dispersions. Low molecular weight starter molecules having a molecular weight of less than 65 g/mol are described in particular as being particularly suitable (examples 1 and 4 of the examples). Such low molecular weight starter molecules may for example be ethylene glycol (dihydric alcohol) or ethylenediamine. However, this results in the need for a solvent during the production in order to achieve a certain filling level of the tank prior to addition of the styrene oxide.

Styrene oxide has to be added slowly, since the ring-opening anionic polymerization proceeds with a high exothermicity and releases large amounts of heat. Therefore, in these cases a solvent is needed in order to guarantee a filling level of the tank at which the stirrer can engage and mix efficiently. One example is the solvent bis(2-methoxyethyl) ether (diglyme). This solvent in turn brings about volatile organic constituents in the dispersing agent, unless it were to be removed in a laborious manner. With respect to increasingly more stringent governmental regulations and increasing consumer awareness in the paints and coatings industry, such volatile constituents (volatile organic compounds, VOCs, and semi-volatile organic compounds, SVOCs) should in the best case be avoided entirely so that the resulting paints continue to qualify for an eco-label. In particular, dispersing agents should not contain such volatile constituents, since it is not possible to completely dispense with VOC/SVOC contents in the case of the other ingredients (binder, coalescing agent) and hence a degree of freedom in formulation for the paint manufacturer must be ensured.

It was therefore an object of the present invention to provide VOC- and SVOC-free dispersing agents, for example for use in pigment preparations or for the preparation of dispersion-type crop protection formulations. In the case of pigment preparations, these should have a high color strength and a low viscosity. Further essential coating properties should not be negatively impacted. An example that should be mentioned is the compatibility with the base paint, which is tested by means of what is known as the rub-out test. The rub-out should accordingly be minimized.

Pesticides are typically used in the form of preparations in order to achieve better utilization of the active agents. Such preparations are also referred to as formulations and are generally in solid or liquid form. Liquid pesticide preparations have the advantage that they are more readily dosable for the user and are homogeneously distributable in the spray liquor. Modern pesticides are usually complex organic molecules which exhibit only low solubility in water or other solvents. Therefore, these pesticides are expediently provided in dispersed form as suspension concentrates.

In the case of these dispersion-type crop protection formulations, especially suspension concentrates, the solid active agents should be efficiently dispersed in the manner of small particles and sedimentation should be prevented. The small particle nature of the active agents ensures that the active agent can accordingly be taken up by the plant or by the target organism. In the case of emulsifiable concentrates, hydrophobic solvents and, dissolved therein, pesticidal active agents and wetting and emulsifying dispersing agents are formulated as concentrates and are formulated for application by dilution with aqueous liquids to give an aqueous spray liquor in which the hydrophobic solvents and active agents are present in an emulsified form.

Dispersing agents are necessary for stabilizing pesticides in suspension concentrates. These dispersing agents, optionally assisted by suitable surface-active substances (wetting agents), make it possible to prepare the suspension concentrate, which is generally done with the aid of grinding order to introduce high mechanical forces into the system. After the grinding operation, the dispersing agents have a stabilizing effect on the system as a result of steric or electrostatic interactions. Dispersing agents may be of anionic, cationic, amphoteric or non-ionic structure. They may have a low molecular weight nature, or constitute higher molecular weight polymers which form a random, alternating, block-type, comb-type or star-form structure of the polymerized monomers.

Examples of commercially significant dispersing agents which are used in large amounts for preparing suspension concentrates are sulfonated condensation products of alkylnaphthalenes with formaldehyde (naphthalene sulfonates) or lignosulfonates. However, these products no longer meet current requirements in terms of toxicological harmlessness and user safety since they irritate the skin and eyes. In addition, these dispersing agents are not particularly effective, that is to say relatively large amounts are needed in order to obtain stable suspension concentrates.

It was therefore an object of the present invention to make available suspension concentrates based on dispersing agents which even in small amounts enable sufficient stabilization of the suspension concentrate, are easy to process, are preferably in liquid form and which feature an advantageous toxicological profile.

This object was surprisingly achieved particularly well by branched polymeric structures which are alkylene oxide addition products started from trihydric or higher-hydric polyols. These are block copolymers which comprise structural units formed from polyol, styrene oxide and at least one alkylene oxide.

As a result of the at least trihydric starter molecules, these polymers have star-type or dendrimer-type structures with a rather hydrophobic core and a rather hydrophilic periphery. When using other starter molecules and compositions or block sequences other than those mentioned, dispersing agents are obtained which, when used in pigment and crop protection formulations, do not exhibit the whole profile of properties mentioned above, in particular with regard to volatile organic contents and the coloristic properties and also viscosity, stability and compatibility.

The invention provides compositions containing compounds of formula (I), formula (II), or mixtures thereof,

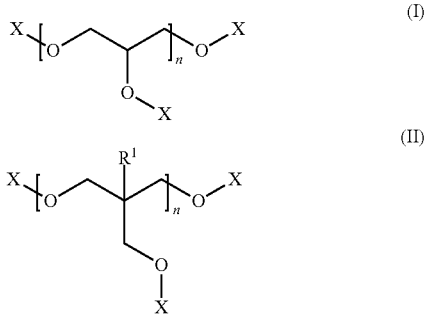

wherein
n is an integer greater than or equal to 1
$R^1$ is an aliphatic, linear or branched hydrocarbon radical having 1 to 10 carbon atoms, a hydrogen atom, the structural unit —O—X, or the structural unit —$CH_2$—O—X,
X corresponds to formula (III)

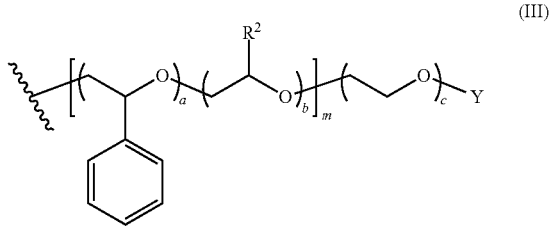

in which
a is an integer from 2 to 6,
b is an integer from 0 to 3,
c is an integer from 20 to 28,
m is 1 or 2,
$R^2$ is an aliphatic, linear or branched hydrocarbon radical having 1 to 10 carbon atoms,
Y is hydrogen, —$SO_3M$, —$SO_2M$, —$PO_3M_2$ or —$CH_2COOM$, and
M is a cation.

The compounds of formula (I), formula (II), or mixtures thereof are preferably suitable for functioning as emulsifier or dispersant. They are referred to hereinafter as dispersants according to the invention or dispersing agents according to the invention. The emulsifying or dispersing action exists preferably for hydrophobic solvents or for dispersions of pesticides, in each case in aqueous liquids, and for inorganic or organic pigments in aqueous liquids.

The invention further provides for the use of compounds of formula (I), formula (II), or mixtures thereof as an emulsifier or dispersant for hydrophobic solvents or for dispersions of pesticides in aqueous liquids.

The invention further provides a process for emulsifying or dispersing at least one hydrophobic solvent or pesticide in aqueous liquids by adding at least one dispersing agent of formula (I) or (II) to the mixture of hydrophobic solvent or pesticide and aqueous liquid.

The invention further provides a process for preparing compounds of formula (I), formula (II), or mixtures thereof, by
1. providing an alcohol resulting from formula I or formula II by formal replacement of the X radical with H,
2. alkoxylating said alcohol with 2 to 6 mol of styrene oxide per active hydrogen and optionally with up to 3, preferably 0 to 2, especially 0 or 1, mol of a $C_3$- to $C_{12}$-alkylene oxide per active hydrogen, wherein the alkoxylation can be effected simultaneously with styrene oxide and the $C_3$- to $C_{12}$-alkylene oxide or sequentially,
3. optionally repeating step 2 once or twice, and
4. alkoxylating the product thus obtained with 20 to 28 mol of ethylene oxide per active hydrogen.

If step 2 is repeated once or twice, it should be ensured that the molar amounts a and b of styrene oxide and the $C_3$- to $C_{12}$-alkylene oxide are in the range indicated above at the end of the alkoxylation.

The alkoxylation is conducted using alkali metal, alkaline-earth metal or double metal cyanide catalysts. Typical reaction temperatures are in the range from 130–140° C. The reaction is conducted under inertized conditions (with nitrogen blanketing) at typical pressures of from 2 to 9 bar.

In formula (III), the wavy line indicates the bond position of this radical to the rest of the molecule (formula I or II). Starting from this bond, it is necessary for the structural unit with the stoichiometric index m to always be before the structural unit with the stoichiometric index c, that is to say that the polyol starter is always reacted first with the styrene oxide and/or an alkylene oxide other than ethylene oxide, before ethylene oxide is added on by polymerization. The blocks with the stoichiometric indices a and b within the brackets with the stoichiometric index m can, in contrast, be arranged in a random or blockwise manner.

In a preferred embodiment, a is the number 3, 4 or 5, especially 3 or 4.

In a preferred embodiment, b is a number from 0 to 2, especially 0 or 1.

In a preferred embodiment, m is 1.

In a preferred embodiment, Y is H or —$PO_3M_2$.

In a preferred embodiment, a is 3, 4 or 5, especially 3 or 4, b is zero or 1 and the ratio of (a+b):c is 1:4 to 1:6.

In a preferred embodiment, M is hydrogen, a cation from the group $Na^+$, $K^+$, $NH_4^+$, triethanolammonium, or a combination thereof.

In a preferred embodiment, the composition according to the invention comprises a compound of formula I and/or II, in which
a is a number from 2 to 6,
b is a number from 0 to 3,
c is a number from 20 to 28,
m is the number 1 or 2, in particular 1, and
Y is H or —$PO_3M_2$.

In a further preferred embodiment, the dispersing agent corresponds to formula (I), in which a is a number from 2 to 6, b is equal to zero or 1, m is equal to one, and c is a number from 20 to 28.

In a preferred embodiment, $R^1$ is —$CH_2$—O—X.

In a preferred embodiment, n is 1.

In a preferred embodiment, $R^2$ is $CH_3$.

In all abovementioned embodiments, a is in particular 3, 4 or 5, especially 3 or 4.

The dispersing agents according to the invention are prepared by addition and anionic polymerization of styrene oxide, ethylene oxide, propylene oxide, butylene oxide or longer-chain alkylene oxides onto polyols. The alkoxylation is effected at one or more oxygen atoms of these polyols. The alkoxylation is conducted using known catalysts, for example alkali metal, alkaline-earth metal or double metal cyanide catalysts under an inertized operation mode. Typical temperatures are in the range from 130-140° C., and typical pressures are in the range from 2 to 9 bar. The anionic polymerization can be effected in a random (within block m) or blockwise (within block m and in relation of m to c) manner.

The synthesis can be conducted with auxiliary solvents where the ratio of monomers to starter molecule is too great for a sufficient mixing of starter and catalyst at the start of the reaction to be guaranteed. Such solvents may be glycols, glycol ethers, glymes or other organic solvents.

However, the dispersing agents according to the invention can also be prepared in substance without solvent. At the end of the reaction, it may be necessary to neutralize the catalyst. This can be done with usual acids such as organic carboxylic acids (e.g. acetic acid, lactic acid, isononanoic acid) or inorganic acids (mineral acids).

The dosage form of the polymers can be in substance (high-viscosity liquids) or in solution. The solution may contain residual solvents from the synthesis. In contrast, an aqueous dosage form is preferred on account of the easier handleability due to the lower viscosity in the subsequent preparation of pigment dispersions or crop protection agents. This also ensures that no volatile organic ingredients (VOCs/SVOCs) are introduced into the final compositions obtained when using the dispersants according to the invention.

Following the copolymerization, the nonionic dispersing agent of formula (I) or (II) formed in the first stage can be modified by adduct formation with an anionic group. Suitable anionic groups are sulfuric monoesters obtainable by reaction of the nonionic dispersing agents according to the invention with amidosulfonic acid, or phosphoric esters prepared by reaction of the nonionic dispersing agents according to the invention with orthophosphoric acid, polyphosphoric acid or phosphorus pentoxide $P_2O_5$. Ether carboxylic acids can be prepared by reacting the nonionic dispersing agents according to the invention with monochloroacetic acid under alkaline conditions.

In a particularly preferred embodiment, the dispersing agent according to the invention after synthesis is mixed to give an 80% aqueous mixture and neutralized with lactic acid. Lactic acid has the advantage that it has a pKa of 3.90 and has extremely little odor compared with other organic acids such as for example acetic acid. This procedure is particularly preferred for those dispersing agents according to the invention in which a is a number from 2 to 6, b is equal to zero, m is equal to 1 and c is a number from 20 to 28.

In a particularly preferred embodiment, the dispersing agent according to the invention, in which a is a number from 2 to 6, b is equal to zero and c is a number from 20 to 28, is modified at the end of the reaction so that Y is phosphate.

The dispersing agents according to the invention are suitable for dispersing at least one solid pesticide in aqueous liquids, by adding at least one dispersing agent of formula (I) or (II) to the mixture of hydrophobic solvent or pesticide and aqueous liquid, the emulsions or dispersions thus prepared containing (A) 3% to 80% by weight, preferably 20% to 70% by weight, in particular 30% to 65% by weight, of at least one hydrophobic solvent or pesticide, (B) 0.1% to 30% by weight, preferably 1% to 15% by weight, of at least one dispersing agent of formula (I) and/or (II), (C) 5% to 99%, preferably 5% to 90% by weight, particularly preferably 10% to 70% by weight, of water.

The one or more pesticides of component (A) of the aqueous formulations of crop protection agents according to the invention are preferably selected from the group consisting of herbicides, insecticides and fungicides.

Preferred fungicides are aliphatic nitrogen fungicides, amide fungicides such as acyl amino acid fungicides or anilide fungicides or benzamide fungicides or strobilurin fungicides, aromatic fungicides, benzimidazole fungicides, benzothiazole fungicides, carbamate fungicides, conazole fungicides such as imidazoles or triazoles, dicarboximide fungicides, dithiocarbamate fungicides, imidazole fungicides, morpholine fungicides, oxazole fungicides, pyrazole fungicides, pyridine fungicides, pyrimidine fungicides, pyrrole fungicides, quinone fungicides.

Preferred herbicides are amide herbicides, anilide herbicides, aromatic acid herbicides such as benzoic acid herbicides or picolinic acid herbicides, benzoylcyclohexanedione herbicides, benzofuranyl alkylsulfonate herbicides, benzothiazole herbicides, carbamate herbicides, carbanilate herbicides, cyclohexene oxime herbicides, cyclopropylisooxazole herbicides, dicarboximide herbicides, dinitroaniline herbicides, dinitrophenol herbicides, diphenyl ether herbicides, dithiocarbamate herbicides, imidazolinone herbicides, nitrile herbicides, organophosphorus herbicides, oxadiazolone herbicides, oxazole herbicides, phenoxy herbicides such as phenoxyacetic acid herbicides or phenoxybutanoic acid herbicides or phenoxypropionic acid herbicides or aryloxyphenoxypropionic acid herbicides, pyrazole herbicides such as benzoylpyrazole herbicides or phenylpyrazole herbicides, pyridazinone herbicides, pyridine herbicides, thiocarbamate herbicides, triazine herbicides, triazinone herbicides, triazole herbicides, triazolone herbicides, triazolopyrimidine herbicides, uracil herbicides, urea herbicides such as phenylurea herbicides or sulfonylurea herbicides.

Preferred insecticides are carbamate insecticides such as benzofuranyl methylcarbamate insecticides or dimethylcarbamate insecticides or oxime carbamate insecticides or phenyl methylcarbamate insecticides, diamide insecticides, insect growth regulators, macrocyclic lactone insecticides such as avermectin insecticides or milbemycin insecticides or spinosyn insecticides, nereistoxin analog insecticides, nicotinoid insecticides such as nitroguanidine nicotinoid insecticides or pyridylmethylamine nicotinoid insecticides, organophosphorus insecticides such as organophosphate insecticides or organothiophosphate insecticides or phosphonate insecticides or phosphoramidothioate insecticides, oxadiazine insecticides, pyrazole insecticides, pyrethroid insecticides such as pyrethroid ester insecticides or pyrethroid ether insecticides or pyrethroid oxime insecticides, tetramic acid insecticides, tetrahydrofurandione insecticides, thiazole insecticides.

The one or more pesticides of component a) of the suspension concentrates according to the invention is/are particularly preferably selected from the group consisting of triazole fungicides, strobilurin fungicides, neonicotinoid insecticides, phenylpyrazole insecticides, benzoylcyclohexanedione herbicides, triazine herbicides and sulfonylurea herbicides.

The one or more pesticides of component a) of the suspension concentrates according to the invention is/are especially preferably selected from the group consisting of epoxiconazole, tebuconazole, azoxystrobin, trifloxystrobin, imidacloprid, thiacloprid, thiamethoxam, fipronil, ethiprole, mesotrione, tembotrione, atrazine, nicosulfuron, iodosulfuron and mesosulfuron.

The dispersing agents according to the invention are also particularly suitable for the preparation of pigment preparations with organic and/or inorganic pigments. In an exemplary composition, a pigment preparation thus prepared can comprise the following constituents:

(A) 3% to 80% by weight, preferably 20% to 70% by weight, in particular 30% to 65% by weight, of at least one organic and/or inorganic pigment.
(B) 0.1% to 30% by weight, preferably 1% to 15% by weight, of at least one dispersing agent of formula (I) and/or (11).
(C) 0% to 50% by weight, preferably 1% to 20% by weight, of a humectant, typically a polyethylene glycol ether having a mean molar mass of between 200 and 2000 g/mol.
(D) 0% to 2% by weight, preferably 0.02% to 0.5% by weight, of an antifoam.
(E) 0% to 2% by weight, preferably 0.02% to 0.2% by weight, of a preserving agent.
(F) 5% to 90% by weight, preferably 10% to 70% by weight, of water.

Component (A) of the pigment preparation is preferably a small-particle organic or inorganic pigment or a mixture of various organic and/or inorganic pigments. The pigments can be used here in the form of a dry powder, as granules, or else as water-moist press cakes.

The pigment preparations prepared with the dispersant according to the invention have good storage stability and exhibit a very low tendency towards agglomeration and sedimentation. The pigment preparations possess high color strengths, defined hues and low viscosities. The pigment preparations are compatible in common aqueous paint systems, such as for example emulsion paints with high pigment volume concentrations and emulsion paints with low pigment volume concentrations.

Crop protection formulations with solid pesticides can be prepared as follows:

General method for preparing suspension concentrates:

All components, except for the thickener used for adjusting the rheology, for example Kelzan® S solution, are preliminarily dispersed with a dissolver. The subsequent fine grinding is effected in a bead mill until the desired particle size has been reached. This is followed by addition of the aqueous Kelzan® S solution and adjustment to the desired final viscosity.

In the case of the emulsifiable concentrates, the water-immiscible solvent is mixed together with the one or more pesticidal active agents, the dispersing agent and the further components to form a concentrate. The concentrate is emulsified to give a spray liquor by dilution with aqueous liquids.

Pigment preparations can be prepared using the dispersant according to the invention by dispersing component (A) in the form of powder, granules or aqueous press cakes in the presence of water and component B, and optionally (C), (D), (E), in a conventional manner per se, then optionally admixing water and adjusting the aqueous pigment dispersion obtained to the desired concentration with water. Preference is given to mixing and homogenizing the components (B), (C), (D), (E) and (F) and then stirring component (A) into the initially charged mixture, with conversion of the pigment to a paste and preliminary dispersion thereof. Depending on the particle hardness of the pigments used, this is optionally followed, while cooling, by fine dispersion or fine distribution using a grinding or dispersing apparatus. For this purpose, it is possible to use stirrer systems, dissolvers (sawtooth stirrers), rotor-stator mills, ball mills, stirred ball mills such as sand mills and bead mills, high-speed mixers, kneading apparatuses, roll mills or high-performance bead mills. The fine dispersion or grinding of the pigments is effected down to the desired particle size distribution, and can be effected at temperatures in the range from 0 to 100° C., expediently at a temperature of 20 to 60° C. Following the fine dispersion, the pigment preparation can be diluted further with water, preferably deionized or distilled water.

Pigment preparations containing the dispersing agents according to the invention are particularly suitable for the pigmentation or the preparation of emulsion paints and other paints and dispersion varnishes used for façade paints.

The dispersing agents according to the invention are free of alkylphenol and alkylphenol ethoxylates and therefore wastes containing the dispersing agents according to the invention are not harmful to aquatic organisms.

EXAMPLES

Synthesis of Examples 1 to 3 and Comparative Examples 1 to 4

Example 1: Pentaerythritol+4 Mol of Propylene Oxide+12 Mol of Styrene Oxide+80 Mol of Ethylene Oxide A 1 L glass autoclave was initially charged with the reaction product of pentaerythritol and 4 eq. of propylene oxide (150.0 g, 0.41 mol) together with potassium hydroxide (40% by weight in water; 2.40 g). The mixture was dried at 125° C. under reduced pressure for one hour. Styrene oxide (587.1 g, 4.89 mol) was then added in portions at this temperature. The reaction was monitored by titration of the epoxide number. The intermediate was then cooled down to 100° C. and isolated. The intermediate (250.0 g, 0.14 mol) was then initially charged anew in a 1 L glass autoclave heated to 125° C. 486.7 g (11.05 mol) of ethylene oxide were metered in in portions at this 30 temperature under an inertized operation mode at a total pressure of 2-5 bar. After reacting to constant pressure, the product was cooled down to 80° C., traces of unreacted ethylene oxide were removed by application of reduced pressure for 30 min, and the product was isolated.

Example 2: Glycerol+12 Mol of Styrene Oxide+75 Mol of Ethylene Oxide

A 1 L autoclave was initially charged with glycerol (200 g, 2.17 mol) and KOH (40% aq., 30.46 g), the mixture was dried at 120° C. for 2 hours and then heated to 130° C. Styrene oxide (521.9 g, 4.34 mol) was added in portions at this temperature. The reaction was monitored by titration of the epoxide number. The intermediate was isolated and a portion (172.0 g, 0.51 mol) was initially charged in a further reaction and converted by the portionwise addition of styrene oxide (735.9 g, 6.12 mol) at 130° C. The reaction was monitored by titration of the epoxide number. The intermediate (200.0 g, 0.13 mol) was initially charged in an autoclave and reacted with ethylene oxide (459.5 g, 10.4 mol) at 135° C. under an inertized operation mode at a total pressure of 2-6 bar. After reacting to constant pressure, the product was cooled down to 80° C., traces of unreacted ethylene oxide were removed by application of reduced pressure for 30 min, and the product was isolated.

Example 3: Glycerol+12 Mol of Styrene Oxide+75 Mol of Ethylene Oxide+Phosphate Sodium Salt The precursor was prepared in analogy with "example 2". A stirring apparatus was initially charged with example 2 (1730.7 g) and this was heated to 60° C. before polyphosphoric acid (117.1 g) was metered in over a period of 2.5 hours. The internal temperature of the exothermal reaction was in the range from 60–70° C. After addition of had ended, the mixture was allowed to continue to react for 1 hour at 70° C. and for a further 5 hours at 100° C. The product was adjusted with sodium hydroxide solution (50% by weight aq.) to a pH of 7.7 and the total water content was adjusted to 20% by weight.

Comparative Example 1: Ethylenediamine+16 Styrene Oxide+100 Ethylene Oxide

Ethylenediamine (60.1 g) was dissolved in dimethyl tetraglycol (294.5 g) and reacted with styrene oxide (480.6 g). Potassium hydroxide was added (40% by weight aq., 15.0 g) and the water present was removed at 100° C. under reduced pressure. Further styrene oxide (1441.8 g) was then added and the intermediate was isolated after the reaction was complete. In a following reaction, the intermediate (341.6 g) was reacted with ethylene oxide (656.5 g). After complete reaction, the product was adjusted to a water content of 20% and isolated.

Comparative Example 2: Ethylenediamine+4 Propylene Oxide+8 Styrene Oxide+80 Ethylene Oxide In analogy to the syntheses described above, the reaction product of ethylenediamine and 4 eq. of propylene oxide (200.0 g, 0.68 mol) was alkalized with potassium hydroxide (40% by weight in water; 5.59 g) and dried and reacted at 130° C. with styrene oxide (587.1 g, 4.89 mol). The intermediate (220.0 g, 0.17 mol) obtained was reacted at 135° C. with ethylene oxide (583.1 g, 13.24 mol). After reacting to constant pressure, the product was cooled down to 80° C., traces of unreacted ethylene oxide were removed by application of reduced pressure for 30 min, and the product was isolated.

Comparative Example 3: Pentaerythritol+4 Propylene Oxide+4 Styrene Oxide+10 Ethylene Oxide In analogy to the syntheses described above, the reaction product of pentaerythritol and 4 eq. of propylene oxide (225.0 g, 0.61 mol) was alkalized with potassium hydroxide (40% by weight in water; 3.61 g) and dried and reacted at 130° C. with styrene oxide (293.5 g, 2.44 mol). The intermediate (180.0 g, 0.21 mol) obtained was reacted at 135° C. with ethylene oxide (373.6.7 g, 8.48 mol). After reacting to constant pressure, the product was cooled down to 80° C., traces of unreacted ethylene oxide were removed by application of reduced pressure for 30 min, and the product was isolated.

Comparative Example 4: Pentaerythritol+4 Propylene Oxide+8 Styrene Oxide+140 Ethylene Oxide In analogy to the syntheses described above, the reaction product of pentaerythritol and 4 eq. of propylene oxide (225.0 g, 0.61 mol) was alkalized with potassium hydroxide (40% by weight in water; 3.61 g) and dried and reacted at 130° C. with styrene oxide (587.1 g, 4.89 mol). The intermediate (180.0 g, 0.14 mol) obtained was reacted at 135° C. with ethylene oxide (834.9 g, 18.95 mol). After reacting to constant pressure, the product was cooled down to 80° C., traces of unreacted ethylene oxide were removed by application of reduced pressure for 30 min, and the product was isolated.

Examples 1-3 according to the invention are started from pentaerythritol or glycerol. Example 1 was propoxylated once per alcohol group, before the styrene oxide and ethylene oxide blocks were added. In examples 2-3, glycerol was used as starter without propoxylation, and first styrene oxide was added, and thereafter ethylene oxide was added.

Comparative example 1 contains ethylenediamine as starter molecule. Diglyme is therefore necessary as polymerization solvent. This has the result that the polymeric dispersing agent thus obtained contains VOCs/SVOCs and hence does not satisfy the requirement.

In comparative example 2—similarly to in example 1 according to the invention—a single propoxylation was conducted per amine hydrogen. As a result, a starter with a relatively high molecular weight can be produced with which there is then no need for the use of a solvent for the subsequent polymerization. Comparative example 2 is therefore VOC/SVOC-free. Because of the use of ethylenediamine as starter, comparative example 2 is not in accordance with the invention.

Comparative example 3 was prepared using a polyol starter, pentaerythritol. In comparative example 3, a=1, i.e. the styrene oxide content is lower than that required according to the invention.

Comparative example 4 was prepared using a polyol starter, pentaerythritol. In comparative example 4, c=35, i.e. the ethylene oxide content is higher than that required according to the invention.

TABLE 1

Properties of the examples

| | Composition | OH number [mg KOH/g] | Viscosity at 60° C. [mPas] |
|---|---|---|---|
| Example 1 | Pentaerythritol + 4 mol propylene oxide + 12 styrene oxide + 80 ethylene oxide | 1.3 | 236 |
| Example 2 | Glycerol + 12 styrene oxide + 75 ethylene oxide | 51 | 269 |
| Example 3 | Glycerol + 12 styrene oxide + 75 ethylene oxide + phosphate | Total phosphorus: 2.25% by weight | 1007 |

TABLE 1-continued

Properties of the examples

| | Composition | OH number [mg KOH/g] | Viscosity at 60° C. [mPas] |
|---|---|---|---|
| Comparative example 1 | sodium salt Ethylene-diamine + 16 styrene oxide + 100 ethylene oxide | Total nitrogen: 0.44% by weight | 145 |
| Comparative example 2 | Ethylene-diamine + 4 propylene oxide + 8 styrene oxide + 80 ethylene oxide | 59 | 237 |
| Comparative example 3 | Pentaerythritol + 4 propylene oxide + 4 styrene oxide + 40 ethylene oxide | 102 | 154 |
| Comparative example 4 | Pentaerythritol + 4 propylene oxide + 8 styrene oxide + 140 ethylene oxide | 38 | 324 |

The OH numbers and viscosities reported were determined on 100%-pure substance. The number of oxide units reported is based on the whole molecule. In order to arrive, from the reported numbers, at the values for a, 5 b and c, these should be divided by the number of active hydrogen atoms in the starter molecule, for example 3 for glycerol and 4 for pentaerythritol.

TABLE 2

Structures of the examples

| | Composition | Structure |
|---|---|---|
| Example 1 | Pentaerythritol + 4 mol propylene oxide + 12 mol styrene oxide + 80 mol ethylene oxide | 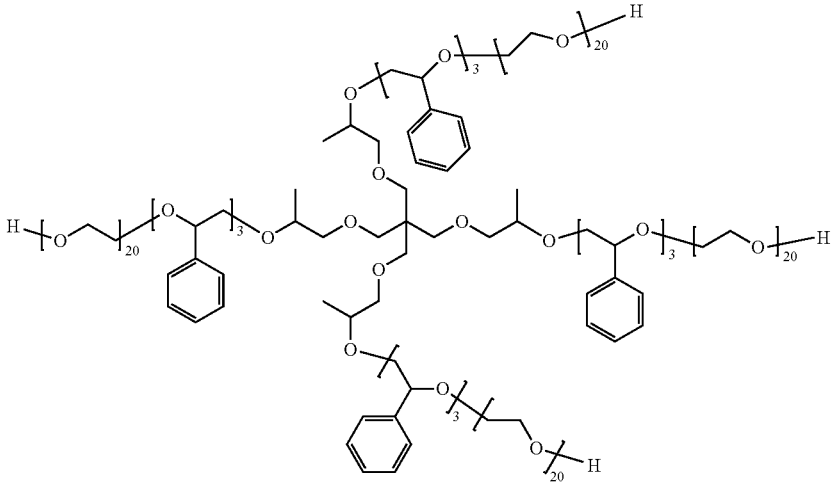 |
| Example 2 | Glycerol + 12 mol styrene oxide + 75 mol ethylene oxide | 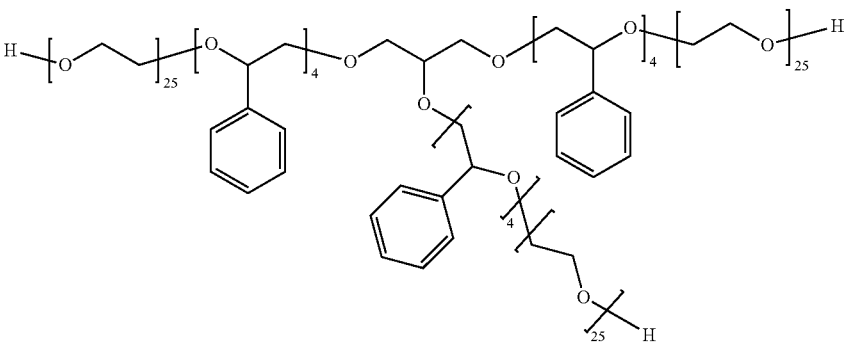 |

TABLE 2-continued
Structures of the examples
| | Composition | Structure |
|---|---|---|
| Example 3 | Glycerol + 12 mol styrene oxide + 75 mol ethylene oxide + phosphate sodium salt | 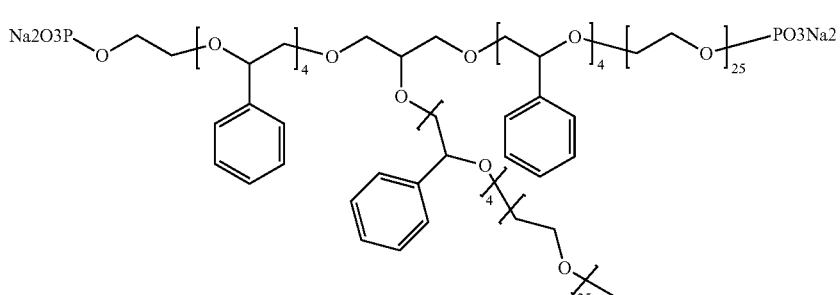 |
| Comparative example 1 | Ethylenediamine + 16 mol styrene oxide + 100 mol ethylene oxide | 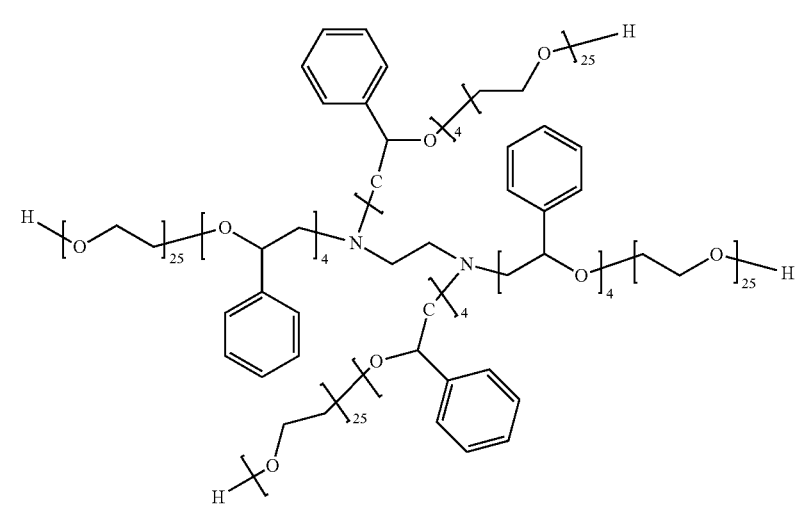 |
| Comparative example 2 | Ethylenediamine + 4 mol propylene oxide + 8 mol styrene oxide + 80 mol ethylene oxide | 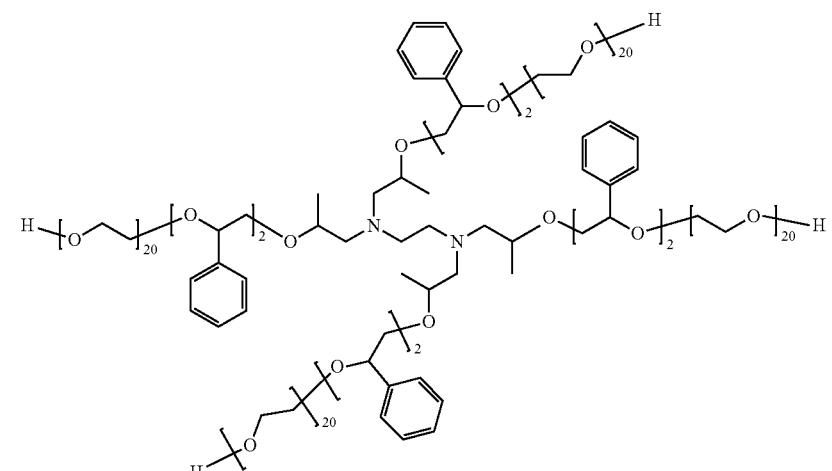 |

TABLE 2-continued

Structures of the examples

| Composition | | Structure |
|---|---|---|
| Comparative example 3 | Pentaerythritol + 4 mol propylene oxide + 4 mol styrene oxide + 40 mol ethylene oxide | 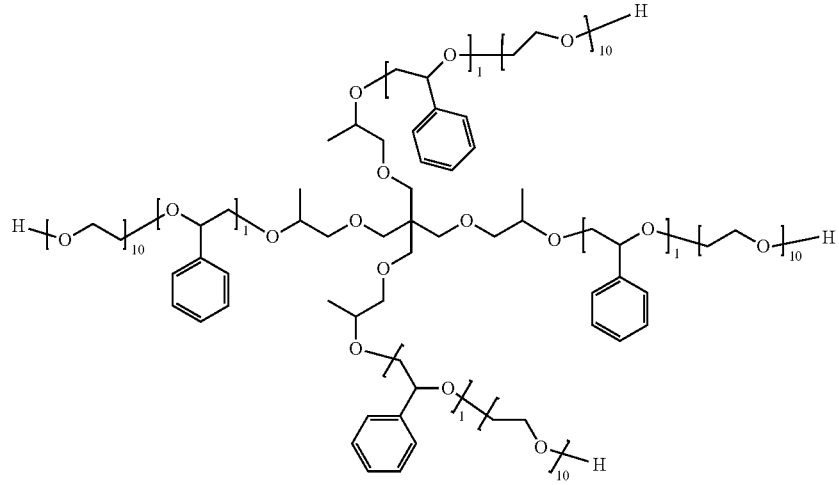 |
| Comparative example 4 | Pentaerythritol + 4 mol propylene oxide + 8 mol styrene oxide + 140 mol ethylene oxide | 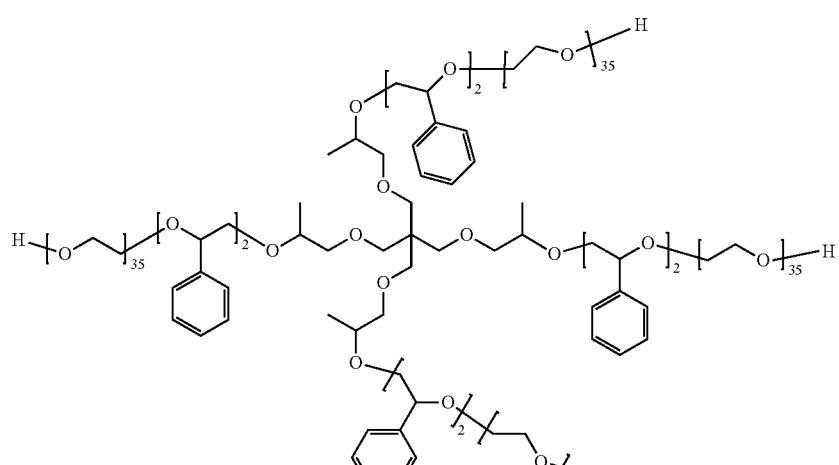 |

In order to assess the suitability of the polymers as dispersing agents for pigments, aqueous pigment pastes were prepared. To this end, the pigment, together with the dispersing agent according to the invention and other additives known from the prior art, was formed into a paste in deionized water and then preliminarily dispersed with a dissolver (for example of CN-F2 type from VMA-Getzmann GmbH) or another suitable apparatus. Fine dispersion was then effected using a bead mill (for example APS 500 from VMA-Getzmann) or another suitable dispersing unit, the grinding being performed using siliquartzite beads or zirconium mixed oxide beads having a size d=1 mm while coaling. The grinding media were then removed from the pigment dispersion and said dispersion was assessed. In particular, the polymers according to the invention were compared with the comparative examples with regard to viscosity, color strength and compatibility.

To this end, the following four base preparations were selected (all figures in % by mass are based on the total composition=100%).

TABLE 3

Test compositions I to IV.

| Item | | I | II | III | IV |
|---|---|---|---|---|---|
| Pigment brand name | | Hostaperm Blue B2G-EDS | Hansa Brilliant Yellow 2 GX70S | Hostaperm Green GNX | Bayferrox Red 130 |
| Pigment Color Index | | P.B. 15:3 | P.Y. 74 | P.G. 7 | P.R. 101 |
| Pigment | A | 45 | 50 | 45 | 65 |
| Dispersing agent | B | 6 | 4 | 6 | 4 |
| Antifoam | C | 0.3 | 0.3 | 0.3 | 0.3 |
| Humectant | D | 10 | 10 | 10 | 10 |
| Aqueous biocide | E | 0.2 | 0.2 | 0.2 | 0.2 |
| Other | F | — | — | — | Oleic acid 1% |
| Water | G | to 100 | to 100 | to 100 | to 100 |

The pigment preparation was prepared by initially charging components B, C, D, E, F and G and mixing them. The pulverulent component A was then added and preliminarily dispersed with the dissolver. Fine dispersion was effected in a bead mill using zirconium mixed oxide beads having a size d=1 mm while cooling. Grinding times were between 30 and 60 minutes. The grinding medium was then removed and the pigment preparation was isolated. The pigment preparation was analyzed after 24 hours in respect of color strength (tinting in emulsion paint) and viscosity. It was then stored Compatibility was determined by means of a rub-out test. To this end, the emulsion paint was applied after mixing with the pigment dispersion to a paint card. The lower part of the paint card was subsequently rubbed with a finger. Incompatibility was present when the rubbed area was more strongly colored than the adjacent, non-aftertreated area (cf. also in this respect DE 2 368 946). The following results were achieved:

TABLE 4

Performance results for the preparations

| Example | Preparation type | Dispersing agent | VOC/SVOC | Color strength | Compatibility | Viscosity (mPas) | Storage stability |
|---|---|---|---|---|---|---|---|
| 1 | I | Example 1 | no | very good | no rub-out | 90 | very good |
| 2 | I | Example 2 | no | very good | no rub-out | 92 | very good |
| 3 | I | Example 3 | no | very good | no rub-out | 95 | very good |
| 4 | I | Comparative example 1 | yes | good | no rub-out | 83 | not storage-stable |
| 5 | I | Comparative example 2 | no | very good | no rub-out | 117 | not storage-stable |
| 6 | I | Comparative example 3 | no | very good | no rub-out | 191 | paste already solid after one week |
| 7 | I | Comparative example 4 | no | very good | no rub-out | 160 | not storage-stable |
| 9 | II | Example 1 | no | very good | no rub-out | 259 | very good |
| 9 | II | Example 2 | no | very good | no rub-out | 102 | very good |
| 10 | II | Example 3 | no | very good | no rub-out | 176 | very good |
| 11 | II | Comparative example 1 | yes | very good | no rub-out | 74 | very good |
| 12 | II | Comparative example 2 | no | good | strong rub-out | 86 | very good |
| 13 | II | Comparative example 3 | no | good | no rub-out | 68 | not storage-stable |
| 14 | II | Comparative example 4 | no | good | no rub-out | 305 | not storage-stable |
| 15 | III | Example 1 | no | very good | no rub-out | 107 | very good |
| 16 | III | Example 2 | no | very good | no rub-out | 105 | very good |
| 17 | III | Example 3 | no | very good | no rub-out | 246 | very good |
| 18 | III | Comparative example 1 | yes | very good | no rub-out | 105 | not storage-stable |
| 19 | III | Comparative example 2 | no | good | strong rub-out | 539 | very good |
| 20 | IV | Example 1 | no | very good | no rub-out | 728 | good |
| 21 | IV | Comparative example 1 | yes | Creation of a free-flowing paste not possible | | | | for 28 days at 50° C. and reanalyzed in respect of both properties to give the storage stability.

The viscosity was analyzed with a cone/plate viscometer (Haake Viscotester 550 model) from Thermofischer GmbH at 20° C. over the shear rate range of 0 to 200 s$^{-1}$, the shear rate of 60 s$^{-1}$ being used to give the viscosity.

The storage stability was assessed on the basis of the viscosity. The storage stability after 24 h was compared with the viscosity measured after warm storage at 50° C. for 28 days. A paste was assessed as "very good" in terms of its storage stability when these viscosities do not differ in absolute amount by more than 200 mPas and the paste exhibited no sedimentation or syneresis. The storage stability was labelled as "good" when the viscosity changed by more than the amount of 200 mPas and/or slight sedimentation occurred. Non-storage-stable pastes thickened significantly during storage (rise in viscosity of more than 400 mPas) or became semisolid or thixotropic.

Color strength was determined in accordance with DIN 55986 by conducting a 2% tinting of an emulsion paint with the paste of interest. The tinted paint was then drawn down in a defined layer thickness onto a paint card and analyzed after drying with a Konica Minolta spectrophotometer.

As can be seen in the above examples, better results in terms of color strength, compatibility, viscosity and storage stability are achieved when polyols are used as starter and the amounts of oxirane derivatives in accordance with the invention are used.

Pigment Blue 15:3, which is used in the preparations of example A, can be satisfactorily dispersed in all aspects with examples 1-3 according to the invention. In contrast, preparations with comparative examples 1 and 2 are not storage-stable, which is identifiable by a significant increase in viscosity during storage and thixotropy in the case of comparative example 1. Comparative examples 3 and 4, with styrene oxide/ethylene oxide content not in accordance with the invention, stand out firstly due to very intense foam formation. In addition, the preparation with comparative example 3 is already semisolid after a week. The preparation with comparative example 4 is not storage-stable, either.

Pigment Yellow 74, which is used in all preparations of example B, is a pigment which can be dispersed with relative ease and therefore can also be dispersed satisfactorily by many dispersing agent examples. In the case of comparative example 2, a high degree of incompatibility of the paste with the base paint is seen, as a very strong rub-out is observed. Comparative example 1 leads to a pigment preparation containing volatile organic constituents (VOCs/SVOCs). In addition, comparative examples 3 and 4 stand out again due to intense foam formation and a lack of storage stability.

Pigment Green 7, which is used in the preparations of example B, can be satisfactorily dispersed in all aspects with examples 1-3 according to the invention. In the case of comparative example 1, the lack of storage stability is again an issue, including thixotropy and a viscosity increase within a week of greater than 1000 mPas. In the case of comparative example 2, a high degree of incompatibility arises again, as a very strong rub-out is observed.

Pigment Red 101 is the sole inorganic pigment of the examples. Example 1 can also disperse this inorganic pigment sufficiently well. In the event of storage, slight sedimentation occurs which can however be readily stirred up again. This property can be compensated again in more developed preparation formulations using rheology additives. It was not possible to create a free-flowing paste with comparative example 1.

Comparative example 1 was started with ethylenediamine and contains diglyme as solvent, which contributes VOCs/SVOCs. Color strengths of a quality similar to those with examples 1-3 according to the invention can be achieved with this dispersing agent in organic pigments, however, only the paste with the less-demanding Pigment Yellow 74 is storage stable. For inorganic iron oxide red, comparative example 1 is not advisable.

Comparative example 2 likewise contains ethylenediamine as starter, but also contains one propylene oxide unit per active amine oxygen before the styrene oxide blocks. This synthesis strategy makes it possible to operate without solvent since the single propoxylation increases the molecular weight of the starter. Therefore, the requirements for a VOC/SVOC-free dispersing agent are satisfied. However, comparative example 2 regularly leads to incompatibilities with the base paint in tinting, visible through a strong rub-out in yellow and green.

In the case of Pigment Blue 15:3. the paste is not storage stable; there is significant formation of sediment which cannot readily be redispersed. Therefore, this example does not satisfy the requirements.

The amine-started comparative examples cannot fulfill the requirements in all claims and all tested pigment preparations. They do not have the formula (I) or (II) according to the invention as starter.

Comparative example 3 with a styrene oxide content not in accordance with the invention (a=1) does not satisfy the object either, and neither does comparative example 4 with an excessively high ethylene oxide content (c=35).

Examples 1-3 according to the invention achieve the technical object set in regards to pigment dispersions, irrespective of whether propoxylation was conducted on the polyol starter (example 1) or not (examples 2-3).

In summary, it can be stated that the object is achieved only by the polymers according to the invention with polyol starters and correct contents of styrene oxide and ethylene oxide. Only the polymers according to the invention satisfy all required criteria in the resulting pigment preparations.

Crop Protection Formulation Example

| Suspension concentrate with 430 g/L tebuconazole | | | |
|---|---|---|---|
| Composition | SC 1 [%] | SC 2 [%] | SC 3 [%] |
| Tebuconazole | 40.70 | 40.70 | 40.70 |
| Example 2 | 0.60 | | |
| Comparative example 3 | | 0.60 | |
| Comparative example 4 | | | 0.60 |
| Genapol PF 40 | 1.25 | 1.25 | 1.25 |
| Propylene glycol | 5.25 | 5.25 | 5.25 |
| Silfoam SE 3060 | 0.50 | 0.50 | 0.50 |
| Thickener solution with xanthan gum (2% solution in water) | 10.00 | 10.00 | 10.00 |
| Deionized water | 41.70 | 41.70 | 41.70 |
| Σ | 100.00 | 100.00 | 100.00 |
| Appearance | white suspension | solid | solid |
| Density [g/ccm] | 1.078 | n.d. | n.d. |
| pH [1%] | 6.49 | n.d. | n.d. |
| Suspensibility [%] | 94.26 | n.d. | n.d. | n.d. = not determinable

In the crop protection formulation with tebuconazole as well, only the formulation with example 2 according to the invention results in a stable suspension, whereas the formulations with the comparative examples are solid.

The invention claimed is:

1. A composition containing compounds of formula (I), formula (II), or mixtures thereof,

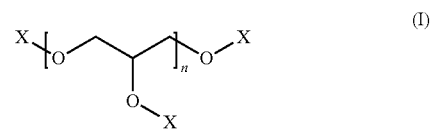 (I)

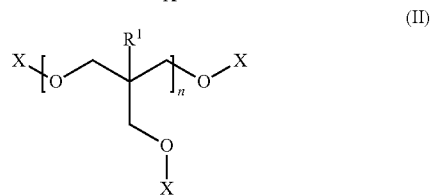 (II)

wherein n is an integer greater than or equal to 1

$R^1$ is an aliphatic, linear or branched hydrocarbon radical having 1 to 10 carbon atoms, a hydrogen atom, the structural unit —O—X, or the structural unit —CH$_2$—O—X, X corresponds to formula (III)

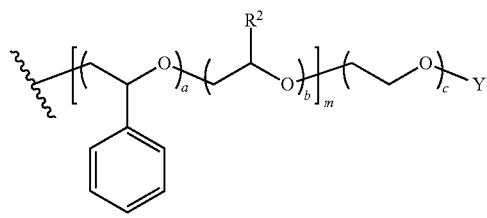

in which
a is an integer from 2 to 6,
b is an integer from 0 to 3,
c is an integer from 20 to 28,
m is 1 or 2,
$R^2$ is an aliphatic, linear or branched hydrocarbon radical having 1 to 10 carbon atoms,
Y is hydrogen, —$SO_3M$, —$SO_2M$, —$PO_3M_2$ or —$CH_2COOM$, and
M is a cation.

2. The composition as claimed in claim 1, wherein in formula III, read from left to right, block m is before block c, and wherein blocks a and b are arranged within m in a random or blockwise manner.

3. The composition as claimed in claim 1, wherein a is 3, 4 or 5.

4. The composition as claimed in claim 1, wherein b is an integer from 0 to 2.

5. The composition as claimed in claim 1, wherein m is equal to 1.

6. The composition as claimed in claim 1, wherein Y is H or —$PO_3M_2$.

7. The composition as claimed in claim 1, wherein the ratio of (a+b):c is 1:4 to 1:6.

8. The composition as claimed in claim 1, wherein
a is a number from 2 to 6,
b is a number from 0 to 3,
c is a number from 20 to 28,
m is 1 or 2, and
Y is H or —$PO_3M_2$.

9. The composition as claimed in claim 1, wherein a is a number from 2 to 6, b is zero or 1, m is equal to one, and c is a number from 20 to 28.

10. The composition as claimed in claim 1, wherein $R^1$ is —$CH_2$—O—X.

11. The composition as claimed in claim 1, wherein $R^2$ is —$CH_3$.

12. The composition as claimed in claim 1, wherein n is 1.

13. A process for preparing compounds of formula (I), formula (II), or mixtures thereof,

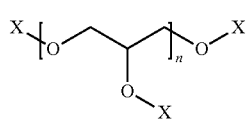

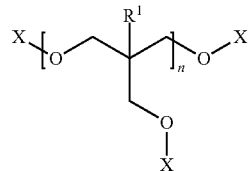

wherein
n is an integer greater than or equal to 1 $R^1$ is an aliphatic, linear or branched hydrocarbon radical having 1 to 10 carbon atoms, a hydrogen atom, the structural unit —O—X, or the structural unit —$CH_2$—O—X,
X corresponds to formula (III)

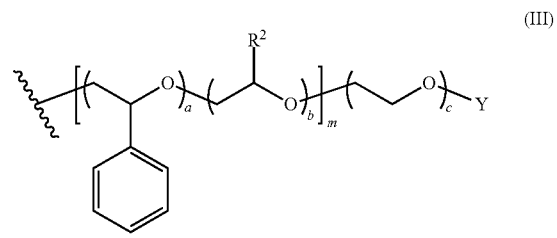

in which
a is an integer from 2 to 6,
b is an integer from 0 to 3,
c is an integer from 20 to 28,
m is 1 or 2,
$R^2$ is an aliphatic, linear or branched hydrocarbon radical having 1 to 10 carbon atoms,
Y is hydrogen, —$SO_3M$, —$SO_2M$, —$PO_3M_2$ or —$CH_2COOM$, and
M is a cation,
by
1. providing an alcohol resulting from formula I or formula II by formal replacement of the X radical with H,
2. alkoxylating the alcohol with, per active hydrogen atom, 2 to 6 mol of styrene oxide and optionally with up to 3 mol of a $C_3$- to $C_{12}$-alkylene oxide, wherein the alkoxylation can be effected simultaneously with styrene oxide and the $C_3$- to $C_{32}$-alkylene oxide or sequentially,
3. optionally repeating step 2 once or twice, and
4. alkoxylating the product thus obtained with 20 to 28 mol of ethylene oxide per active hydrogen atom.

14. The process as claimed in claim 13, wherein the alkoylating is conducted using alkali metal, alkaline-earth metal or double metal cyanide catalysts.

15. The process as claimed in claim 13, wherein the alkoylating is conducted at temperatures in the range from 130-140° C. and at a pressure of from 2 to 9 bar.

16. The process as claimed in claim 13, wherein an alkali, alkaline earth or double metal cyanide catalyst is present in the alkoylating step, and wherein the catalyst is neutralized at the end of reaction.

17. The process as claimed in claim 13, further comprising the step of modifying the product obtained by adduct formation with an anionic group Y, wherein Y is selected from the group consisting of —$SO_3M$, —$SO_2M$, —$PO_3M_2$ and —$CH_2COOM$.

18. The process as claimed in claim 13, further comprising the step after the end of reaction, wherein the product obtained is mixed with an aqueous substance and neutralized with lactic acid.

19. The process as claimed in claim 13, wherein a is a number from 2 to 6, b is zero or 1, m is equal to 1, and c is a number from 20 to 28.

20. The process as claimed in claim 13, wherein Y is $PO_3M_2$.

21. A dispersing agent for aqueous formulations of crop protection agent, comprising at least one compound of formula (I), formula (II), or mixtures thereof,

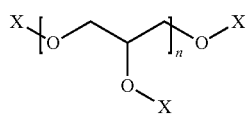

(I)

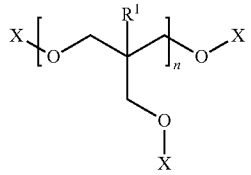

(II)

wherein
n is an integer greater than or equal to 1
$R^1$ is an aliphatic, linear or branched hydrocarbon radical having 1 to 10 carbon atoms, a hydrogen atom, the structural unit —O—X, or the structural unit —CH$_2$—O—X,
X corresponds to formula (III)

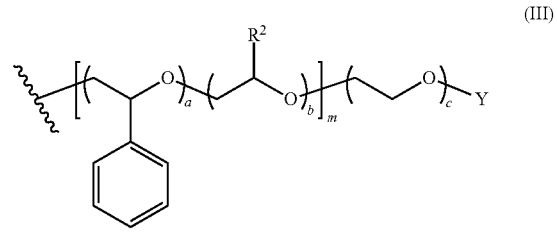

(III)

in which
a is an integer from 2 to 6,
b is an integer from 0 to 3,
c is an integer from 20 to 28,
m is 1 or 2,
$R^2$ is an aliphatic, linear or branched hydrocarbon radical having 1 to 10 carbon atoms,
Y is hydrogen, —SO$_3$M, —SO$_2$M, —PO$_3$M$_2$ or —CH$_2$COOM, and
M is a cation.

* * * * *